US009164750B2

(12) United States Patent
Arpirez (10) Patent No.: US 9,164,750 B2
(45) Date of Patent: Oct. 20, 2015

(54) MANAGING TARGET COMPUTER USING ENCAPSULATED FILE

(75) Inventor: Julio Cesar Arpirez, Madrid (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 2086 days.

(21) Appl. No.: 10/375,198

(22) Filed: Feb. 28, 2003

(65) Prior Publication Data

US 2004/0172407 A1 Sep. 2, 2004

(51) Int. Cl.
*G06F 9/46* (2006.01)
*G06F 9/445* (2006.01)

(52) U.S. Cl.
CPC .......................................... *G06F 8/65* (2013.01)

(58) Field of Classification Search
CPC ................................. G06F 17/00; G06F 17/30
USPC .............................. 707/10, 103, 204; 709/203
See application file for complete search history.

(56) References Cited

U.S. PATENT DOCUMENTS

| | | | | |
|---|---|---|---|---|
| 5,832,511 A * | 11/1998 | Beck et al. | ............................. | 1/1 |
| 6,026,500 A * | 2/2000 | Topff et al. | ....................... | 714/26 |
| 6,098,098 A * | 8/2000 | Sandahl et al. | ............... | 709/221 |
| 6,535,894 B1 * | 3/2003 | Schmidt et al. | ........................ | 1/1 |
| 6,542,908 B1 * | 4/2003 | Ims | ...................................... | 1/1 |
| 6,718,364 B2 * | 4/2004 | Connelly et al. | .............. | 709/203 |
| 6,757,685 B2 * | 6/2004 | Raffaele et al. | ........................ | 1/1 |
| 6,766,353 B1 * | 7/2004 | Lin et al. | ........................ | 709/203 |
| 6,920,608 B1 * | 7/2005 | Davis | ............................. | 715/209 |
| 6,941,510 B1 * | 9/2005 | Ozzie et al. | ..................... | 715/234 |
| 6,947,943 B2 * | 9/2005 | DeAnna et al. | ............... | 717/120 |
| 7,730,111 B2 * | 6/2010 | DeAnna et al. | ............... | 707/803 |
| 2003/0050932 A1 * | 3/2003 | Pace et al. | ...................... | 707/100 |

OTHER PUBLICATIONS

BEA Systems, "Deploying EJBs to WebLogic Server", Dec. 22, 2001, BEA Systems, pp. 1-7.*

* cited by examiner

*Primary Examiner* — Farhan Syed
(74) *Attorney, Agent, or Firm* — Burns, Doane, Swecker & Mathis LLP (57) ABSTRACT

An encapsulated file is accessed at a management computer. The encapsulated file contains plural files and a deployment descriptor. The deployment descriptor is used to update the management computer about the plural files. A function is executed using at least one of the plural files.

11 Claims, 3 Drawing Sheets

MANAGING TARGET COMPUTER USING ENCAPSULATED FILE

RELATED APPLICATIONS

The patent applications "System And Method Of Using A Transactional Unit Comprised Of Transactional Subunits", by Julio Cesar Arpirez Vega, U.S. Ser. No. 10/375,083, and "Method For Managing Plurality Of Target Computers Using A Management Computer", by Julio Cesar Arpirez Vega and Miguel Murillo Condon, U.S. Ser. No. 10/375,176, which are filed concurrently with the present application are incorporated herein by reference.

BACKGROUND

Some computer networks use a management computer to configure target computers. For example, in an Internet data center, a management computer can configure a large number of target computers to provide data and other information to users across the Internet.

New operations can be added to the target computers of a network using the management computer. In one example, files including code and documentation are used to add operations to the network. The files can include source code, scripts, third-party libraries, and deployment descriptors. The transfer of these files to the management computer for configuring a target computer can be difficult when, for example, a large number of files is involved. Further, since the files for an operation can be located in different directories of the management computer, it can be difficult to modify, update or move these files.

SUMMARY

Exemplary methods are disclosed for processing an encapsulated file at a management computer. An exemplary method comprises accessing an encapsulated file at a management computer. The encapsulated file contains plural files and a deployment descriptor. The deployment descriptor is used to update the management computer about the plural files. A function is executed using at least one of the plural files.

Exemplary embodiments of a management computer include a processor configured to access an encapsulated file containing plural files and a deployment descriptor. The processor is configured to use the deployment descriptor to update the management computer about the plural files and configured to cause execution of a function using at least one of the plural files. The management computer is configured to store the plural files.

Exemplary methods are disclosed for processing an encapsulated file at a management computer. An exemplary method comprises accessing an encapsulated file containing plural files at a management computer. At least one of the plural files is an executable file for execution on a target computer. The executable file is extracted from the encapsulated file for transfer to the target computer.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE PREFERRED EMBODIMENTS

Figure 1:
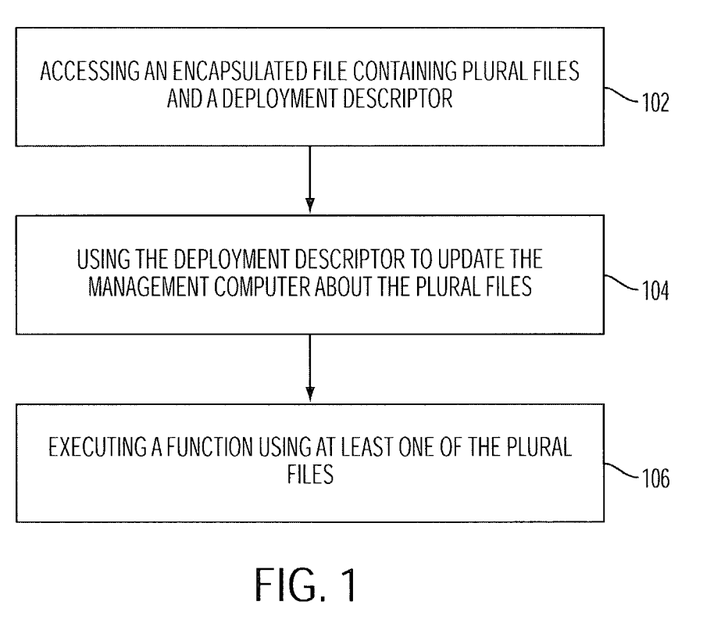
FIG. 1 is a flow chart illustrating steps for processing an encapsulated file at a management computer.

FIG. 1 is a flow chart illustrating an exemplary method of processing an encapsulated file. The method can be implemented using a computer. A computer-readable medium can contain a program which executes the method for processing an encapsulated file at the management computer (e.g., a computer used to program, control, monitor and/or oversee network operations associated with one or more target computers).

In step 102, an encapsulated file containing plural files and a deployment descriptor is accessed. The encapsulated file can, for example, be constructed by a user at a user interface, and transferred to the management computer. The management computer can then use the encapsulated file to configure (or reconfigure) one or more target computers.

As used herein, a "file" is a collection of data associated with an explicit or implicit file name. An "encapsulated file" is a file that contains more than one file and can be transferred or otherwise manipulated using a single explicit or implicit file name. Examples of encapsulated files include ZIP files, Java Archive files (JAR files) or any other file containing plural files. The encapsulated files can be Plug-in ARchive (PAR) files using a PAR extension. The PAR files can conform to the JAR format. The plural files can include executable files. As used herein, a "deployment descriptor" is any file, text, or other information that can be used to update the management computer about the plural files.

In one embodiment, the encapsulated file is data compressed (e.g., by the user interface). This reduces the size of the encapsulated file (e.g., for the encapsulated file to be transferred over a computer network to the management computer).

The encapsulated file can include logic and data for new operations (e.g., operations to be implemented at one or more target computers). For example, the encapsulated file can include java source code, (java files), generated code including class files, documentation, third-party library, executable files such as scripts, environment variable settings, and a deployment descriptor.

The encapsulated file can contain files to add functionality to a management computer. For example, files used for UNIX configuration operations can be included into the encapsulated file. Including such files in an encapsulated file (e.g., in a single file) can simplify the transfer of the files and the manipulation of the files at the management computer. In one example, accessing the encapsulated file comprises receiving the encapsulated file from another portion of the management computer.

In step 104, the deployment descriptor is used to update the management computer about the plural files. The deployment descriptor can be used to associate a function with one of the plural files. In one embodiment, the deployment descriptor includes an indication of tasks that can be executed using the plural files of the encapsulated file. The indication can be used by the management computer to update the management computer to allow a function, such as a type of target computer configuration. The function can include one or more tasks.

The deployment descriptor can indicate the version of the PAR or other encrypted file, name of the PAR or other encrypted file, and/or a deployment mode of the plural files (for example, whether the files are to be copied to a target computer). The deployment descriptor can be used to indicate libraries for use with one or more of the plural files. The deployment descriptor can also be used to indicate locking arguments for the files, tasks or functions indicating which other files, tasks or functions should, for example, be prevented from concurrent operation on a target computer. The use of locking arguments can avoid conflicts in the operation of the functions.

The deployment descriptor can define characteristics of the encapsulated file and thus indicate to the management computer how to use the plural files of an encapsulated file. For example, the deployment descriptor can specify whether the executable files for the encapsulated files should be remotely copied to a target computer, or whether it can be assumed that the executable files already exist on the target computer or are already accessible to the target computer. In one example, the encapsulated file can be considered to have two main parts: a declarative part including the deployment descriptor and environment variable settings that define configurable behavior; and a procedural part including executable files.

In step 106, a function is executed using at least one of the plural files. The functions can include tasks or combinations of tasks. The functions can include configuration of a target computer or other device. The execution of the function can include the transfer and/or execution of an executable file. Executable files include compiled or uncompiled code that can be executed at the target computer. The executable files can include scripts which are programs written in an interpreted programming language such as Perl, Tcl/Tk, PYTHON, VBA, DOS batch file, COM automation, or any other scripting language. Scripts are not compiled and provide flexibility.

In one embodiment, the function includes the transfer of an executable file to a target computer. The execution of the function does not require the transfer of an executable file to the target computer. For example, the function can be a remote procedure call, such as a Java Remote Method Invocation (RMI) call, made to the target computer.

After the encapsulated file is received, the function can be executed without restarting the management computer. In one example, the deployment descriptor is used to update a mapping file or folder. The mapping file or folder associates files from the encrypted file with functions that use these files. The management computer can use the mapping file or folder to find the files needed for a function. When an encrypted file is received, the mapping file or folder can be updated without restarting the management computer. This allows a new function to be added without restarting the management computer. For example, with Java based systems, dynamic class loading can be used.

The management computer can use the encapsulated file to configure a target computer. The execution of the function can include executing the function on a target computer.

Figure 2:
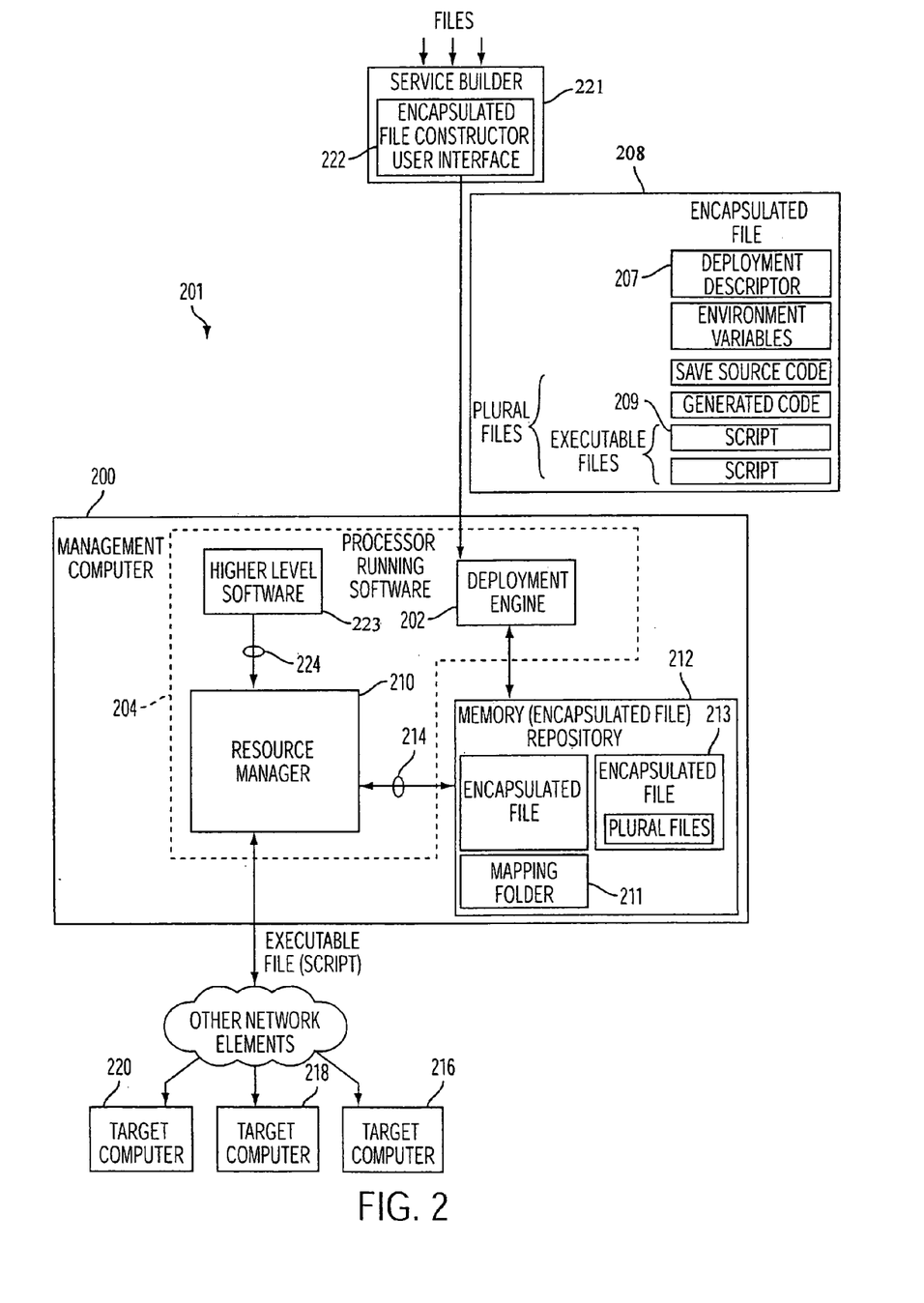
FIG. 2 illustrates a management computer for processing an encapsulated file.

FIG. 2 illustrates an exemplary embodiment of a management computer 200 within a system, or network 201. The management computer 200 comprises a processor 204 and memory 212. The processor 204 is configured to access an encapsulated file 208 containing plural files and a deployment descriptor 207. One of the plural files can be an executable file 209. The processor 204 is configured to use the deployment descriptor 207 to update the management computer 200 about the plural files. The deployment descriptor 207 can be used to associate a function with one of the plural files. In one embodiment, the deployment engine software 202 executing at the processor 204 uses the deployment descriptor to update the mapping folder 211.

The processor 204 is configured to cause execution of a function using at least one of the plural files. For example, the processor can be configured to use the encapsulated file to configure a target computer. The processor can initiate the execution of the function on a target computer. The memory 212 is configured to store the plural files.

In one embodiment, after the encapsulated file is received, the function is executed without restarting the management computer. The mapping folder 211 can be updated with associations between functions and the plural files as the encapsulated files are received. The management computer 200 can use the updated mapping folder 211 to determine which files are needed for a new function without restarting.

One of the plural files can be an executable file which is transferred to a target computer. The system 201 can include the target computer 216 configured to execute the function.

The exemplary FIG. 2 system 201 includes a management computer 200 with deployment engine software that can deploy encapsulated files in the management computer. Deployment engine 202 can include software running on a processor 204 at management computer 200 to receive the encapsulated file 208. The encapsulated file 208 contains plural files, including the executable file 209, and deployment descriptor 207. The deployment can include unencapsulating the encapsulated file, and storing the plural files within the management computer. Additionally, the mapping folder or file 211 can be updated with information concerning the plural files. In one example, the deployment engine software deploys the encapsulated file such that it can be read by resource manager software 210 using an application programing interface (API).

In an exemplary embodiment, the plural files including the executable file are available to resource manager software at the management computer. In FIG. 2, the resource manager software 210 can access executable files using API 214.

The management computer can use the encapsulated file to configure the target computer. In the FIG. 2 example, the management computer sends the executable file to one or more of the target computers 216, 218, or 220. In one example, the management computer provides instructions to the target computers to execute the executable files. The encapsulated file need not contain an executable file, and an executable file need not be transferred to a target computer.

In an exemplary embodiment, the encapsulated file contains directory information for the plural files (e.g., so that the management computer can determine contents, and/or path and/or file types included in the encapsulated file). An exemplary encapsulated file is as follows:

| C:\WINDOWS\TEMP\UXOS.par | | |
|---|---|---|
| Name | Size | Path |
| par.xml | 10,975 | manifest\ |
| HP-UXiamakekey | 20,480 | files\ |
| SunOSiamakekey | 7,060 | files\ |
| addChmod.sh | 819 | scripts\ |
| addDir.pl | 7,290 | scripts\ |
| addIP.sh | 12,873 | scripts\ |
| addUser.sh | 8,032 | scripts\ |
| addUserToGroup.pl | 6,623 | scripts\ |
| createGroup.pl | 2,705 | scripts\ |
| disFTPpub.sh | 1,207 | scripts\ |
| enFTPpub.sh | 1,935 | scripts\ |
| IAPerlCommon.pm | 14,121 | scripts\ |

C:\WINDOWS\TEMP\UXOS.par

| Name | Size | Path |
|---|---|---|
| libscripts | 5,788 | scripts\ |
| removeDir.pl | 2,522 | scripts\ |
| removeGroup.pl | 2,716 | scripts\ |
| rmIP.sh | 7,146 | scripts\ |
| rmUser.sh | 1,543 | scripts\ |
| rmUserFmGroup.pl | 7,374 | scripts\ |
| UXOS.class | 6,468 | classes\com\hp\ov\activator\plugins\ |
| UXOS.java | 49,669 | src\com\hp\ov\activator\plugins\ |

The encapsulated file can contain a number of files, each having a file name. Each file is also associated with a path which can be used by the management computer to construct a directory to store the file. The above example includes the deployment descriptor file, "par.xml", executable files such as "addIP.sh" (a script file), java code such as "UXOS.java", and class file information such as "UXOS.class".

Below is an example of the deployment descriptor file, "par.xml".

```xml
<?xml version="1.0" encoding="UTF-8"?>
<!--> <Copyright © 2002 Hewlett-Packard Company. All Rights Reserved-->
<Plugin version "1.0">
    <!--
        ***
        Plugin Archive Manifest File.
        > <hp OpenView service activator.
        ***
    -->
    <Name>UXOS</Name>
    <Version major="1" minor="0" revision="0"/>
    <Description>A common set of Perl functions.
        </Description>
    <ClassName>com.hp.ov.activator.plugins. UXOS</ClassName>
    <NameSpace type="GLOBAL"/>
    <DeploymentModel>ON_DEMAND</DeploymentModel>
    <Lock>
        <Argument>1</Argument>
    </Lock>
    <Configuration>
        <Param name="FILENOLIST" value="//opt/var/usr/home/users"/>
        <Param name="LOGGING" value="1"/>
    </Configuration>
    <!--Atomic tasks-->
    <AtomicTasks>
        <Task exported="true" execution="ON_LINE">
        <Name>UXOS_addUser</Name>
        <Argument>machine</Argument>
        <Argument>login</Argument>
        <Argument>passwd</Argument>
        <Argument>uid</Argument>
        <Argument>homedir</Argument>
        <Argument>group</Argument>
            <Description>Use the UXOS_addUser atomic task to add a user.
        </Description>
        </Task>
        <Task exported="true" execution="ON_LINE">
        <Name>UXOS_rmUser</Name>
        <Argument>machine</Argument>
        <Argument>login</Argument>
        <Argument>passwd</Argument>
        <Argument>uid</Argument>
        <Argument>homedir</Argument>
        <Argument>group</Argument>
            <Description>Use the UXOS_rmUser atomic task to remove a user.
        </Description>
        </Task>
        <Task exported="true" execution="ON_LINE">
            <Name>UXOS_createGroup</Name>
            <Argument>machine</Argument>
            <Argument>group</Argument>
            <Description>Use the UXOS_createGroup atomic task to create a new group.</Description>
        </Task>
        <Task exported="true" execution="ON_LINE">
            <Name>UXOS_removeGroup</Name>
            <Argument>machine</Argument>
            <Argument>group</Argument>
            <Description>Use the UXOS_removeGroup atomic task to remove a group.</Description>
        </Task>
        <Task exported="true" execution="ON_LINE">
            <Name>UXOS_addUserToGroup</Name>
            <Argument>machine</Argument>
            <Argument>user</Argument>
            <Argument>group</Argument>
            <Description>Use the UXOS_addUserToGroup atomic task to add a user to a group.</Description>
        </Task>
        <Task exported="true" execution="ON_LINE">
            <Name>UXOS_rmUserFmGroup</Name>
            <Argument>machine</Argument>
            <Argument>user</Argument>
            <Argument>group</Argument>
            <Description>Use the UXOS_rmUserFmGroup atomic task to remove a user from a group.</Description>
        </Task>
        <Task exported="true" execution="ON_LINE">
            <Name>UXOS_removeDir</Name>
            <Argument>machine</Argument>
            <Argument>dirPath</Argument>
            <Description>Use the UXOS_removeDir atomic task to remove a directory structure.</Description>
        </Task>
        <Task exported="true" execution="ON_LINE">
            <Name>UXOS_addAliasIP</Name>
            <Argument>machine</Argument>
            <Argument>ipaddr</Argument>
            <Argument>itfname</Argument>
            <Argument>subnetmask</Argument>
            <Argument>broadcastaddr</Argument>
            <Description>Use the UXOS_addAliasIP atomic task to add an alias IP address to an interface.</Description>
        </Task>
        <Task exported="true" execution="ON_LINE">
            <Name>UXOS_rmAliasIP</Name>
            <Argument>machine</Argument>
            <Argument>ipaddr</Argument>
            <Argument>itfname</Argument>
            <Argument>subnetmask</Argument>
            <Argument>broadcastaddr</Argument>
```

```xml
    <Description>Use the UXOS_rmAliasIP atomic task
        to remove an alias IP address from an interface.</Description>
</Task>
<Task exported="true" execution="ON_LINE">
    <Name>UXOS_chmod</Name>
    <Argument>machine</Argument>
    <Argument>permissions</Argument>
    <Argument>object</Argument>
    <Description>Use the UXOS_chmod atomic task to
        change the permissions on a directory or a file.</Description>
</Task>
<Task exported="true" execution="ON_LINE">
    <Name>UXOS_enFTPUser</Name>
    <Argument>machine</Argument>
    <Argument>username</Argument>
    <Description>Use the UXOS_enFTPUser atomic
        taks to allow ftp access to a user's account.</Description>
</Task>
<Task exported="true" execution="ON_LINE">
    <Name>UXOS_disFTPUser</Name>
    <Argument>machine</Argument>
    <Argument>username</Argument>
    <Description>Use the UXOS_disFTPUser atomic
        task to deny ftp access to a user's account.</Description>
</Task>
<Task exported="true" execution="ON_LINE">
    <Name>UXOS_addUserNIS</Name>
    <Argument>machine</Argument>
    <Argument>login</Argument>
    <Argument>passwd</Argument>
    <Argument>uid</Argument>
    <Argument>homedir</Argument>
    <Argument>group</Argument>
    <Description>Use the UXOS_addUserNIS atomic
        task to add a user to the NIS directory service.</Description>
</Task>
<Task exported="true" execution="ON_LINE">
    <Name>UXOS_rmUserNIS</Name>
    <Argument>machine</Argument>
    <Argument>login</Argument>
    <Description>Use the UXOS_rmUserNIS atomic
        task to remove a user from the NIS directory service.</Description>
</Task>
<Task exported="true" execution="ON_LINE">
    <Name>UXOS_createGroupNIS</Name>
    <Argument>machine</Argument>
    <Argument>group</Argument>
    <Description>Use the UXOS_createGroupNIS
        atomic task to add a new group to the NIS directory service.</Description>
</Task>
<Task exported="true" execution="ON_LINE">
    <Name>UXOS_removeGroupNIS</Name>
    <Argument>machine</Argument>
    <Argument>group</Argument>
    <Description>Use the UXOS_removeGroupNIS
        atomic task to remove a group from the NIS directory service.</Description>
</Task>
<Task exported="true" execution="ON_LINE">
    <Name>UXOS_addUserToGroupNIS</Name>
    <Argument>machine</Argument>
    <Argument>group</Argument>
    <Argument>login</Argument>
    <Description>Use the UXOS_addUserToGroupNIS
        atomic task to add a user to an existing group in the
        NIS directory service.</Description>
</Task>
<Task exported="true" execution="ON_LINE">
    <Name>UXOS_rmUserFmGroupNIS</Name>
    <Argument>machine</Argument>
    <Argument>group</Argument>
    <Argument>login</Argument>
    <Description>Use the UXOS_rmUserFmGroupNIS
        atomic task to remove a user from an existing group
        in the NIS directory service.</Description>
</Task>
<Task exported="true" execution="ON_LINE">
    <Name>UXOS_setDiskQuota</Name>
    <Argument>machine</Argument>
    <Argument>login</Argument>
    <Argument>filesystem</Argument>
    <Argument>softblocks</Argument>
    <Argument>hardblocks</Argument>
    <Argument>softinodes</Argument>
    <Argument>hardinodes</Argument>
    <Description>Use the UXOS_setDiskQuota atomic
        task to add a disk quota for a user on a given file
        system.</Description>
</Task>
<Task exported="true" execution="ON_LINE">
    <Name>UXOS_addExport</Name>
    <Argument>machine</Argument>
    <Argument>directory</Argument>
    <Argument>hostname</Argument>
    <Description>Use the UXOS_addExport atomic task
        to allow a host to mount a directory or file.</Description>
</Task>
<Task exported="true" execution="ON_LINE">
    <Name>UXOS_removeExport</Name>
    <Argument>machine</Argument>
    <Argument>directory</Argument>
    <Argument>hostname</Argument>
    <Description>Use the UXOS_removeExport atomic
        task to deny a host from mounting the specified
        directory or file.</Description>
</Task>
<Task exported="true" execution="ON_LINE">
    <Name>UXOS_mountNFS</Name>
    <Argument>machine</Argument>
    <Argument>hostname</Argument>
    <Argument>path</Argument>
    <Argument>directory</Argument>
    <Description>Use the UXOS_mountNFS atomic
        task to mount a remote NFS directory.</Description>
</Task>
<Task exported="true" execution="ON_LINE">
    <Name>UXOS_umountNFS</Name>
    <Argument>machine</Argument>
    <Argument>directory</Argument>
    <Description>Use the UXOS_umountNFS atomic
        task to unmount a remote NFS directory.</Description>
</Task>
</AtomicTasks>
<!--Scripts section-->
```

```xml
<Scripts>
<Script name="IAPerlCommon" file="IAPerlCommon.pm">
    <Description>A common set of Perl functions.</Description>
</Script>
<Script name="addUser" file="addUser.sh" interpreter="ksh">
    <Description>Adds a User.</Description>
</Script>
<Script name="rmUser" file="rmUser.sh" interpreter="ksh">
    <Description>Removes a User.</Description>
</Script>
<Script name="createGroup" file="createGroup.pl" interpreter="perl">
    <Description>Creates a group.</Description>
</Script>
<Script name="removeGroup" file="removeGroup.pl" interpreter="perl">
    <Description>Removes a group.</Description>
</Script>
<Script name="addUserToGroup" file="addUserToGroup.pl" interpreter="perl">
    <Description>Adds a User to a group.</Description>
</Script>
<Script name="rmUserFmGroup" file="rmUserFmGroup.pl" interpreter="perl">
    <Description>Removes a User from a group.</Description>
</Script>
<Script name="addDir" file="addDir.pl" interpreter="perl">
    <Description>Creates a directory structure.</Description>
</Script>
<Script name="removeDir" file="removeDir.pl" interpreter="perl">
    <Description>Removes a directory structure.</Description>
</Script>
<Script name="addIP" file="addIP.sh" interpreter="ksh">
    <Description>Adds an alias IP address to an interface.</Description>
</Script>
<Script name="rmIP" file="rmIP.sh" interpreter="ksh">
    <Description>Removes an alias IP address from an interface.</Description>
</Script>
<Script name="addChmod" file="addChmod.sh" interpreter="ksh">
    <Description>Change mode on a file.</Description>
</Script>
<Script name="disFTPpub" file="disFTPpub.sh" interpreter="ksh">
    <Description>Disable FTP access for a user.</Description>
</Script>
<Script name="enFTPpub" file="enFTPpub.sh" interpreter="ksh">
    <Description>Enable FTP access for a user.</Description>
</Script>
<Script name="libscripts" file="libscripts">
    <Description>Common shell functions.</Description>
</Script>
</Scripts>
<!--Files section-->
<Files>
    <File name="SunOSiamakekey" file="SunOSiamakekey"/>
    <File name="HP-UXiamakekey" file="HP-UXiamakekey"/>
</Files>
</Plugin>
```

In the above example, the deployment descriptor is an XML file. The tags in the XML file can indicate how to interpret the information in the XML file. In one example, the deployment descriptor can be used to associate a function with a file in the encapsulated files. For example, the file "addUser.sh" is indicated as being a script that is associated with an "add user" function by the deployment descriptor tags.

In one example, a Document Type Definition (DTD), is used to define tags in the deployment descriptor XML file. Document Type Definitions are used for XML files and allow the XML files to be correctly parsed for an application.

The example of FIG. 2 shoes a service builder unit 221. The service builder unit 221 includes an encapsulated file constructor user interface 222. This user interface allows users to specify files which can be grouped together to produce an encapsulated file. In one example, the user interface encapsulates the plural files using a protocol such as the .JAP protocol. The encapsulated file can then be transferred to the management computer 200. In one example, the deployment engine 202 takes the encapsulated file and processes it so that it can be accessed by the resource manager software 210. For example, tags in the deployment descriptor can be used by the resource manager software 210 to identify the functions associated with the plural files. A mapping folder or file 211 can then be constructed to indicate the new functionality. Higher level software 223 can produce instructions across an application programming interface 224 to the resource manager to perform operations that can use the plural files.

The higher-level software 222 can include a compound task transaction controller. The compound task transaction controller can include a transaction manager, a resource adapter connector, and an Enterprise Java Bean (EJB) unit. The higher-level software can also include a user interface workflow manager and a tracking unit. In one example, the higher-level software 222 receives requests to execute a compound task including a number of atomic tasks. An exemplary system is described in the patent application "System And Method Of Using A Transactional Unit Comprised Of Transactional Subunits", by Julio Cesar Arpierz Vega, U.S. Ser. No. 10/375,083, filed concurrently with the present application and incorporated herein by reference. For example, the atomic tasks can be undone under the control of the management computer. Code for atomic tasks can be stored within one of the plural files. In one example, the management computer sets up a table, such as a mapping file or folder, to indicate which of the plural files contains the requested atomic task code.

In one example, the encapsulated file enables a number of related operations. For example, the encapsulated file can enable UNIX operations including add user, remove user and the like. Some of the operations can include steps in which the executable file is transferred from the management computer to a target computer and then the executable file executes at the target computer.

The memory can store the plural files within the encapsulated file such as encapsulated file 213. Alternately, the plural files can be separately stored in the memory. In one example, the encapsulated file 208 contains directory information, as already mentioned, that allows the construction of a directory within the memory 212 to store the plural files. The management computer can use the encapsulated file to configure the target computer. In one example, the configuring of the target computer causes the executable file to execute at the target computer.

In one embodiment, the encapsulated file 208 is data compressed. Data compression reduces the size of the encapsulated file and thus can reduce the amount of data transferred across a computer network to the management computer.

In an exemplary embodiment, the resource manager software 210 at the processor 204 is used to transfer the executable file to the target computer 220. Any suitable file transfer protocol can be used. In one example, the executable file is transferred during a shell session, and the management computer can use the shell session to control the target computer.

In one example, the management computer stores an indication of whether the target computer has the executable file. If the target computer already has the executable file, the executable file does not have to be transferred in the shell session. The executable file can be transferred along with environment variables for use in running the executable file at the target computer.

In the example of FIG. 2, deployment engine 202 is used to deploy the encapsulated file 208 at the management computer. The target computer 220 can be configured to execute the executable file transferred from the management computer.

A system specification for encapsulated files can be followed such that new options can be added into the management computer using an encapsulated file following the system specification. The creation of encapsulated files that comply with the system specification can be aided by the use of the service builder. For example, the system specification can be associated with the PAR format.

In one example, the resource manager software is informed when an encapsulated file has been loaded into the management computer. The resource manager software can extend the capabilities of the system by adding new operations without restarting. Enabling operations with an encapsulated file means that the resource manager software code need not be changed as new operations are added. As long as the operations enabled by the encapsulated files conform to the system specification, any operation can be invoked by the resource manager without code changes to the resource manager software.

Service builder software of unit 221 can use the encapsulated file constructor user interface 222 for the generation of the files and the packing of the files into the encapsulated files. Use of an encapsulated file permits modification of the environment variables and deployment descriptor without recompiling the source code. Simply by modifying these attributes using the user interface and redeploying the new encapsulated file, characteristics of the system can be changed without a recompilation of source code. Customers can use the user interface to modify the operations enabled by the encapsulated file without being concerned with compilation issues or modification of source code to change certain attributes.

In one example, the system 201 comprises an Internet data center. The Internet data center can provide services to users across the Internet. One or more target computers can be configured by the management computer as described herein to provide such services.

Figure 3:
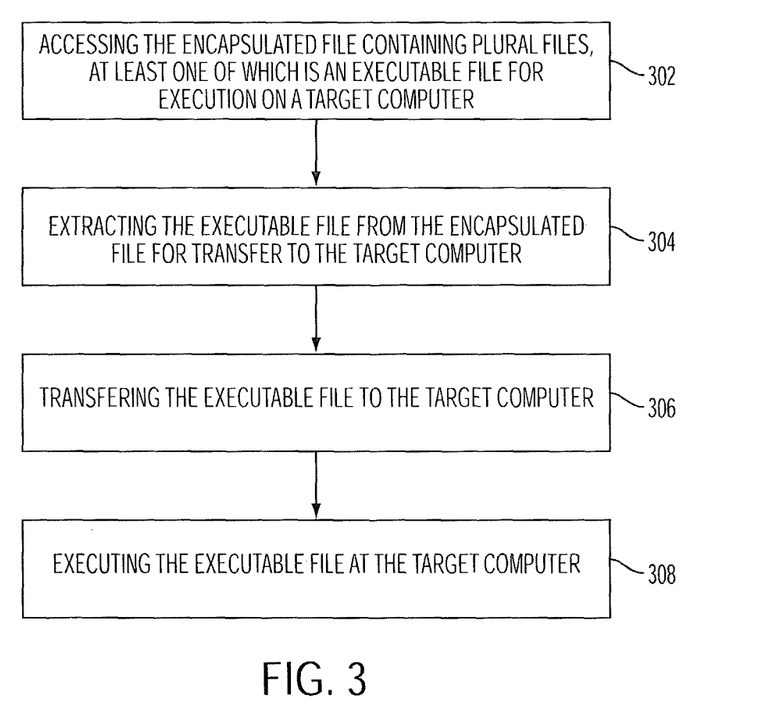
FIG. 3 is a flow chart illustrating an exemplary method of processing an encapsulated file.

FIG. 3 is a flow chart illustrating an exemplary method of processing an encapsulated file at a management computer. In step 302, an encapsulated file containing plural files is accessed. According to an exemplary embodiment, at least one of the plural files contains an executable file for execution on a target computer.

In step 304, the executable file is extracted from the encapsulated file for transfer to the target computer. In an exemplary embodiment, the encapsulated file is unencapsulated and the plural files, including the executable file, are stored at a location where the executable file can be transferred to the target computer. The unencapsulation can be performed following a standard such as the ZIP or JAR standards.

Alternatively, the plural files can be kept within the encapsulated file. Before the transfer of the executed file to the target computer, the executable file can be extracted from the encapsulated file.

In an exemplary embodiment, the accessing of the encapsulated file includes receiving the encapsulated file from another location. The plural files can be encapsulated into the encapsulated file and then provided to the management computer. The encapsulation can be performed using software that constructs a ZIP or JAR file.

In step 306, the executable file is transferred to the target computer. In step 308, the executable file is executed at the target computer. The execution of the executable file at the target computer can be part of the configuration of the target computer.

It will be appreciated by those of ordinary skill in the art that the system and method can be embodied in other specific forms without departing from the spirit or essential character thereof. The presently disclosed embodiments are therefore considered in all respects to be illustrative and not restrictive. The scope of the system and method is indicated by the appended claims rather than the foregoing description, and all changes which come within the meaning and range of equivalents thereof are intended to be embraced therein.

What is claimed is:

1. A method comprising:

receiving, at a management computer, an encapsulated file including a plurality of files and a deployment descriptor, said deployment descriptor including information describing a plurality of configuration tasks performed using the plurality of files, the plurality of files including an executable file;

extracting, by the management computer, the plurality of files and the deployment descriptor from said encapsulated file;

storing, on the management computer, the plurality of files extracted from the encapsulated file;

using, by the management computer, the deployment descriptor extracted from the encapsulated file to identify associations between the plurality of configuration tasks and the plurality of files extracted from the encapsulated file;

updating, by the management computer, a mapping element to include the associations;

using, by the management computer, the mapping element to find at least one of the plurality of files extracted from the encapsulated file needed for a first configuration task of the plurality of configuration tasks; and performing, by the management computer, the first configuration task of the plurality of configuration tasks using the at least one of the plurality of files extracted from the encapsulated file to reconfigure a target computer other than the management computer.

2. A method as recited in claim 1 wherein performing the first configuration task includes said management computer executing said executable file.

3. A method as recited in claim 2 wherein said executing includes making a remote procedure call to said target computer.

4. A method as recited in claim 1 wherein performing the first configuration task includes:

said management computer transferring said executable file to said target computer; and causing said target computer to execute said executable file.

5. A method as recited in claim 4 wherein said extracting said executable file from said encapsulated file occurs before said executable file is transferred to said target computer.

6. A system comprising non-transitory computer-readable storage media, said media being encoded with code configured to, when executed by a management computer having one or more processors, causes the management computer to implement a method including:

determining a configuration function to be applied to a target computer other than said management computer;

identifying required files required by said function, said identifying including accessing, by the management computer, an encapsulated file containing plural contained files and a deployment descriptor, said deployment descriptor including information associating some of said plural contained files with a configuration function requiring that contained file, said plural contained files including an executable file, the information describing a plurality of configuration tasks performed using the plural contained files;

said management computer extracting the deployment descriptor and the plural contained files including said executable file from said encapsulated file;

storing, on the management computer, the plural contained files extracted from the encapsulated file;

identifying, using the deployment descriptor extracted from the encapsulated file, a plurality of associations between the plurality of configuration tasks and the plural contained files extracted from the encapsulated file;

updating, by the management computer, a mapping element to include the associations;

using, by the management computer, the mapping element to find at least one of the plurality of files extracted from the encapsulated file needed for a first configuration task of the plurality of configuration tasks; and performing, by said management computer, the first configuration task of the plurality of configuration tasks using the at least one of the plurality of files extracted from the encapsulated file to reconfigure said target computer.

7. A system as recited in claim 6 wherein said executable file, when executed by one or more processors, causes said management computer to make a remote procedure call to said target computer.

8. A system as recited in claim 6 further comprising a deployment engine for processing said encapsulated file so that it can be accessed by said management computer.

9. A system as recited in claim 6 wherein said code provides for transferring said executable file to said target computer for execution by said target computer to effect configuration of said target computer.

10. A system as recited in claim 9 wherein said extracting said executable file from said encapsulated file occurs before the encapsulated file is transferred to said target computer.

11. A system as recited in claim 6 further comprising said management computer, said management computer including said storage media.

* * * * *